United States Patent [19]

Buike et al.

[11] Patent Number: 4,629,024

[45] Date of Patent: * Dec. 16, 1986

[54] ELECTRICAL POWER ASSISTED STEERING SYSTEM

[75] Inventors: James W. Buike, Union Lake; Ambrose Tomala, Royal Oak, both of Mich.

[73] Assignee: Allied Corporation, Morris Township, Morris County, N.J.

[*] Notice: The portion of the term of this patent subsequent to Jul. 23, 2002 has been disclaimed.

[21] Appl. No.: 754,565

[22] Filed: Jul. 12, 1985

Related U.S. Application Data

[63] Continuation-in-part of Ser. No. 491,947, May 5, 1983, Pat. No. 4,530,413.

[51] Int. Cl.[4] .............................................. B62D 5/04
[52] U.S. Cl. ..................................... 180/79.1; 74/801
[58] Field of Search ................. 180/79.1, 133, 142; 307/360; 74/801; 73/862.33

[56] References Cited

U.S. PATENT DOCUMENTS

| | | | |
|---|---|---|---|
| 2,754,465 | 7/1956 | Brier | 180/79.1 |
| 3,580,352 | 5/1971 | Hestad | 180/79.2 |
| 3,792,629 | 2/1974 | Applebury | 74/801 |
| 3,983,953 | 10/1976 | Bayle | 180/79.1 |
| 4,173,265 | 11/1979 | Kremer | 180/79.1 |
| 4,193,720 | 3/1980 | Machida | 73/862.33 X |
| 4,277,695 | 7/1981 | Wilber et al. | 307/542 |
| 4,415,054 | 11/1983 | Drutchas | 180/79.1 |
| 4,448,275 | 5/1984 | Kitagawa et al. | 180/79.1 |
| 4,471,280 | 9/1984 | Stack | 180/79.1 |
| 4,502,340 | 3/1985 | Gebben | 73/862.33 |

FOREIGN PATENT DOCUMENTS

| | | |
|---|---|---|
| 1183838 | 7/1959 | France . |
| 2242009 | 3/1975 | France . |
| 755484 | 8/1956 | United Kingdom . |

*Primary Examiner*—John J. Love
*Assistant Examiner*—Charles R. Watts
*Attorney, Agent, or Firm*—James R. Ignatowski; Markell Seitzman; Russel C. Wells

[57] ABSTRACT

An electric power assisted steering system for a automotive vehicle having a torque shaft connecting the vehicle's steering wheel with the vehicle's steering mechanism. Rotary power is applied to the output end of the torque shaft by a low speed, high torque electrical motor through a low gear ratio planetary gear system disposed concentrically about the torque shaft. The electric motor is energized by a power amplifier in response to a torque signal generated by a torque sensor responsive to the magnitude and direction of the torque applied between the input and output ends of the torque shaft. The power amplifier has an antilog gain characteristic eliminating the need for a vehicle speed input to reduce or eliminate the authority of the power steering mechanism a nominal and higher vehicle speeds.

31 Claims, 8 Drawing Figures

ELECTRICAL POWER ASSISTED STEERING SYSTEM

CROSS REFERENCE

This application is a continuation-in-part of co-pending commonly assigned patent application Ser. No. 491,947 entitled Electrical Power Assisted Steering Mechanism filed May 5, 1983, U.S. Pat. No. 4,530,413.

BACKGROUND OF THE INVENTION

Field of the Invention

The invention is related to power steering systems for automotive vehicles and in particular to electrically assisted power steering systems.

Hydraulic power steering systems for automotive vehicles have enjoyed wide acceptance by the using public and are available on almost every type of commercially available vehicle. With the down sizing of automobiles and the use of smaller four cylinder engines for economy reasons, the power requirements of the hydraulic pump for power steering systems have become an appreciable portion of the total available power. This is not only true during parking or slow motion maneuvers when the engine is idling but also at highway speed where the hydraulic pump absorbs a portion of the available engine power in parasitic losses such as just spinning the pump. To prevent the engine from stalling due to the increased load on the idling engine during low speed maneuvers, it has been necessary to increase the engines idle speed. Unfortunately the increased idle speed is only required when the low speed steering maneuvers are being executed. At all other times it is unnecessary. Therefore increasing the idle speed to accommodate the use of the hydraulic power steering during low speed steering maneuvers is counterproductive to the economical advantages of the small engines.

Electrical power assisted steering systems, which use the reserve power of the battery during low speed maneuvers could overcome the disadvantages of the hydraulic power steering systems in the smaller vehicles. The concept of using electrical power to assist steering is not new. Hepner in U.S. Pat. No. 3,191,109 and Turible in U.S. Pat. No. 3,351,152 disclose electrical power assisted steering systems having a segmented steering column interconnected by an electrically driven gearing arrangement. Turible also discloses disabling the power assisted steering at speeds above a predetermined low speed to give the operator a normal feel of the road. The power steering arrangement taught by Hepner and Turible are unsatisfactory because the reverse torque generated by the electrically driven gearing arrangement is transmitted back to the operator through the steering wheel.

This disadvantage was overcome by Goodacre et al in U.S. Pat. No. 3,534,623. In the assisted steering system disclosed by Goodacre et al, the two sections of the steering column are directly coupled by a gear train. The gear train responds to a torque above a predetermined level to energize an electric motor coupled to the section of the steering column connected steering gear box. Goodacre et al's system has the disadvantage that it uses a high gear ration between the steering column and the electric motor and requires that the steering wheel must be manually turned to return the vehicle's wheels to their neutral position with the wheels aligned along a straight path. Also the power assist is either "on" or "off" giving the drive little or no feel of the road at the higher speeds.

This problem was overcome by the use of torque responsive manual clutches such as taught by Steinmann in U.S. Pat. No. 3,893,534, Bayle in U.S. Pat. No. 3,983,953 and Adams in U.S. Pat. No. 4,223,254. Deininger et al in U.S. Pat. No. 4,241,804 teaches the same basic concept but uses a counter-rotating clutch mechanism with a non-reversible motor.

The concept of controlling the electrical power applied to the electric motor as a function of the torque applied to the steering wheel is also taught by Bayle, cited above. Bayle discloses a torque sensor which generates a torque signal proportional to the angular displacement between the two sections of the steering column and a pair of switches which generate direction signals indicative of the direction of the applied torque. A computer computes a current applied to the electric motor which is a functon of torque applied to the steering wheel. In alternate embodiments taught by Bayle, the computed electrical power applied to the motor is further modified by an input indicative of the engine speed to improve driveability at nominal road speeds above a predetermined level. Further Bayle teaches the use of an electric clutch to disengage the motor from the steering wheel to eliminate the requirement for the operator to manually return the wheels to their neutral position.

The invention is an electrical power assisted steering system which eliminates both the need for a clutch to disengage the steering column from the electric motor during the return of the wheels to their neutral position and the need for an input indicative of the engine speed for normal and high speed operation.

SUMMARY OF THE INVENTION

The invention is an electrical power assisted steering system designed specifically for todays down sized fuel efficient automotive vehicles. The power assisted steering system has a segmented shaft joined by a torsion element. One member of the shaft is adapted to be connected to a conventional steering mechanism and the other member connected to the vehicle's steering column. A torque sensor responsive to torque applied between the two members of the segmented shaft generates a signal indicative of the direction and magnitude of the applied torque. A low speed, high torque, reversible D.C. electrical motor is connected to the member of the segmented shaft connected to the steering mechanism through a low gear ratio planetary gear system. This arrangement provides the desired power assist to the vehicle's steering mechanism. The electrical motor is energized by an antilog power amplifier in response to the signal received from the torque sensor. The power amplifier has a null output for a predetermined low input signal range centered about the signal received from the torque sensor indicative of zero being applied to the torsion element. The input to output gear ratio of the planetary gear system is between 1:1 and 14:1 and permits the electric motor to be reverse driven through the steering mechanism in the absence of electrical power being applied to the motor.

One advantage of the power assisted steering system is that no electrical or mechanical clutch is requird to disengage the electric motor from the driven member of the shaft to permit the turned wheels to return to their neutral position after the execution of a moving turn.

Another advantage of the power assisted steering system is that the dead band and antilog gain characteristics of the power amplifier elminates the need for a vehicle speed signal input yet affords the drive excellent feel of the road at nominal and high speed operation where power assistance is not required yet provides maximum power assistance during parking and other low speed maneuvers.

These and other advantages will become more apparent from a reading of the specification in conjunction with the drawings.

DETAILED DESCRIPTION OF THE INVENTION

Figure 1:
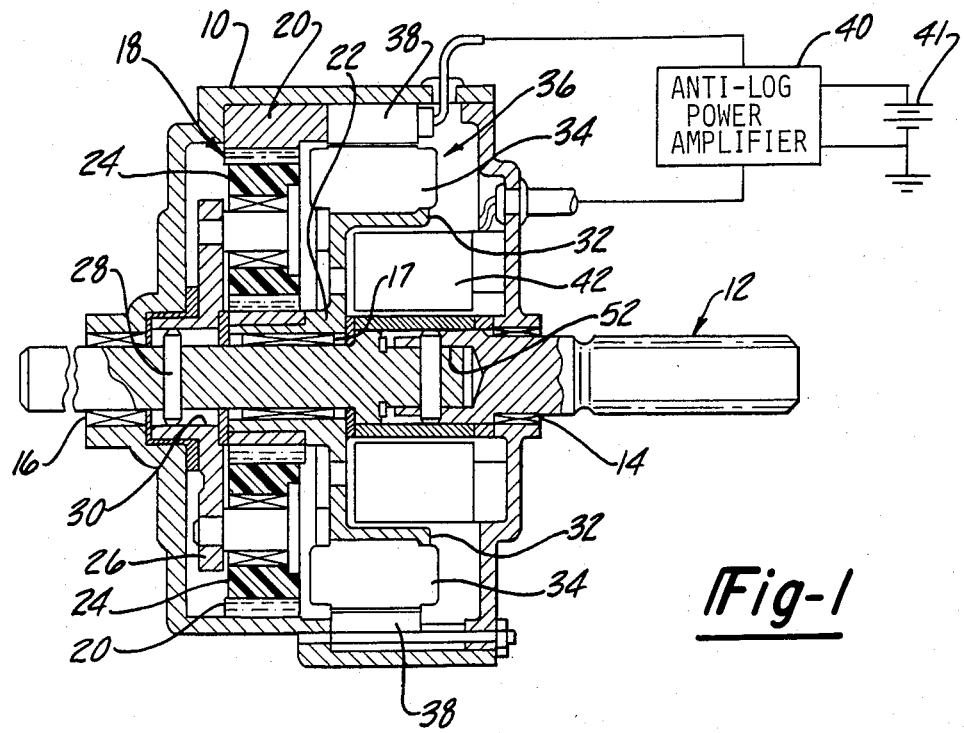
FIG. 1 is a cross section of the electrical power assisted steering system.

Referring to FIG. 1, the electrical power assisted steering system has a housing 10 rigidly mounted to the steering mechanism of the vehicle and a segmented torque shaft 12 passing through the housing and supported at its opposite ends by bearings 14 and 16. An intermediate bearing 17 is disposed between the segmented flexible shaft 12 and the rotor carrier 32 of an electric motor 36.

A planetary gear assembly 18 driven by the electric motor 36 has a stationary internal gear 20 fixedly attached to housing 10, a concentric sun or center gear plurality of planet gears 24 disposed between internal 22 fixedly attached to rotor carrier 32 of motor 36 and a gear 20 and sun gear 22. The planet gears 24 are connected to a planet carrier 26 circumscribing torque shaft 12. The planet carrier 26 is keyed to the segmented torque shaft 12 by means of a key pin 28 which is received in a groove 30 formed in planet carrier 26.

The rotor carrier 32 of electric motor 36 is attached to and rotatably supports the armature 34 of a low speed, high torque reversible DC electric motor 36 circumscribing segmented torque shaft 12. A plurality of permanent magnets 38 attached to the internal surface of housing 10 comprise the stator of electric motor 36. Motor 36 receives the electrical power from an antilog power amplifier 40 as a function of the output from a torque sensor 42 detecting the torque applied to the segmented torque shaft 12 as shall be explained hereinafter. The antilog power amplifier 40 receives electrical power from the vehicles source of electrical power illustrated as battery 41.

Figure 4:
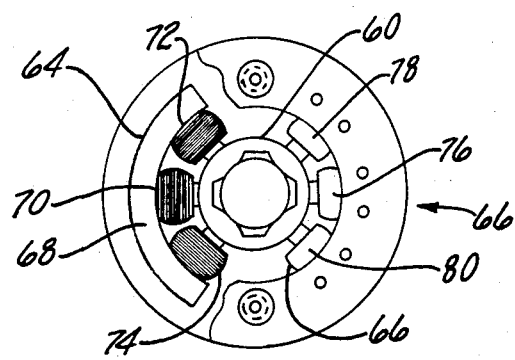
FIG. 4 is a partial cross section of the magnetic induction type torque sensor.
Figure 5:
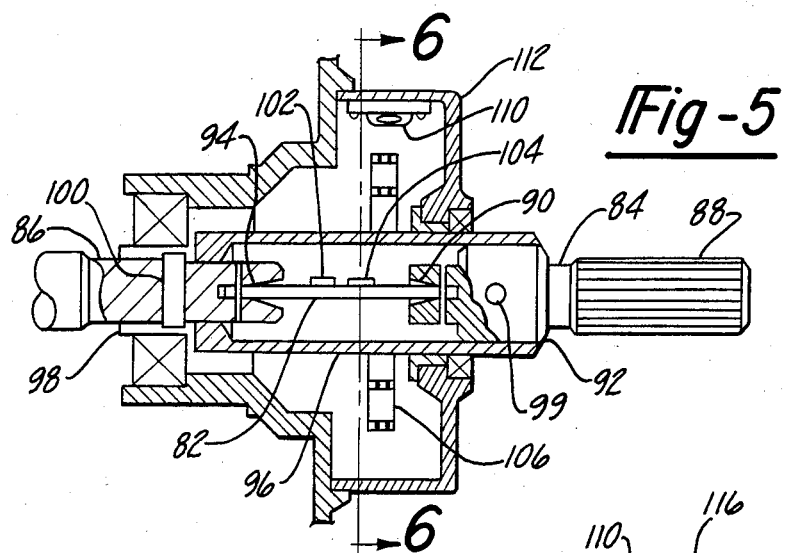
FIG. 5 is a partial cross section of the strain gauge type torque sensor.
Figure 6:
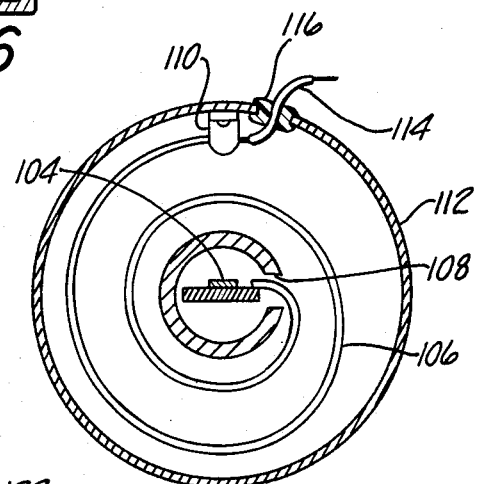
FIG. 6 is a partial cross section of the strain gauge type torque sensor taken normal to the view shown in FIG. 5.

The torque sensor 42 may be a magnetic strain sensor as illustratd in FIG. 1 and 4, a resistive bridge strain gauge as illustrated in FIGS. 5 and 6, or any other type of torque sensor known in the art.

Figure 2:
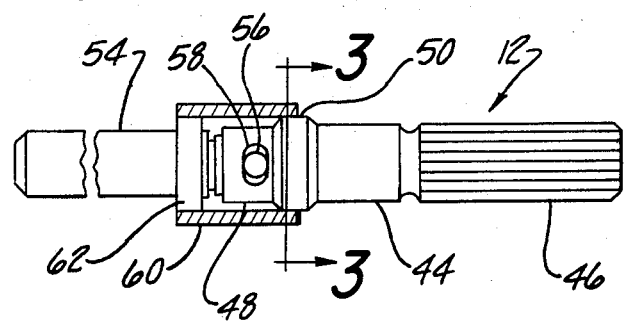
FIG. 2 is an isolated view of the segmented torque shaft rotated 90° from the position shown in FIG. 1.
Figure 3:
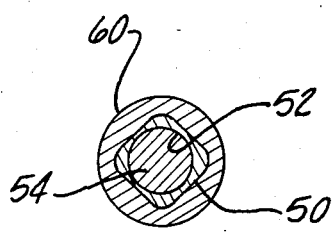
FIG. 3 is a cross section of the segmented torque shaft.

The details of the segmented flexible shaft 12 will now be explained with reference to FIGS. 1, 2 and 3. The shaft 12 illustrated in FIG. 2 is rotated 90 degrees from the position shown in FIG. 1. Segmented flexible shaft 12 has an input member 44 having a splined portion 46 at one end adapted to be connected to the vehicle's steering wheel column (not shown) and an opposite end 48. Intermediate the splined portion 46 and the opposite end 48 is an external "poly spline" portion 50. An internal bore 52 formed in the opposite end 48 as shown in FIG. 1 and 3 is adapted to receive one end of an output member 54. The other end of output member 54 is adapted to be connected to a conventional steering mechanism (not shown).

The input member 44 and output member 54 are rotatably connected by means of a pin 56 pressed into a mating aperture formed in output member 54. The mating aperture 58 in the end portion of input member 44 is elongated as shown to limit the torque applied between the input member 44 and output member 54 to a predetermined value.

The input member 44 and output member 54 are resiliently joined by a cylindrical torque tube 60 having a female "poly spline" section at one end mating with the external poly spline portion 50 of input member 44. The opposite end of the torque tube 60 is fixedly attached to a radial flange 62 formed at the end of output member 54 adjacent to the input member 44. The radial flange 62 may have a "polyspline" configuration corresponding to "poly spline" portion 50 but preferably is circular having a diameter corresponding to the internal diameter of the torque tube 60. The torque tube 60 may be pinned to radial flange 62 or fixedly attached using any other means known in the art. The elongated aperture 58 in the opposite end of the input shaft 44 permits the torque tube 60 to be rotationally stressed to between 2.0 and 3.5 joules before pin 56 contacts the limits of elongated aperture 58. After contact, the torque applied to input member 44 is communicated directly to output member 54 preventing the torque tube from being over stressed. Pin 56 also provides for a positive connection between the input member 44 and output member 54 allowing the operator to retain steering control of the vehicle in the event of a mechanical or electrical failure.

The details of the magnetic torque sensor 42 are illustrated in FIGS. 1 and 4. The sensor comprises a pair of identical but diametrically opposite sensor assemblies 64 and 66. Since both sensor asemblies are identical only sensor assembly 64 will be explained in detail. Sensor assembly 64 comprises an arcuate magnetically susceptable yoke 68 having three radial poles extending inwardly towards the torque tube 60 at 45° intervals. A primary coil 70 is wound around the center poles and produces an alternating magnetic flux flow through the torque tube 60 to the two outer poles. Secondary or sensor coils 72 and 74 wound around outer poles, generate induced electrical signals indicative of the magnetic flux flow through its respective pole. With no stress applied to torque tube 60, the signals induced in the two sensor coils 72 and 74 are equal. However, when a torque is applied in a first direction, torque tube 60 is stressed which perturbates the flow of magnetic flux therethrough. As a result, the electrical signal induced in sensor coil 72 will differ from the electrical signal induced in sensor coil 74 with the difference being indicative of the torque applied to torque tube 60. Reversing the direction of the applied torque likewise changes the magnitude of the electrical signals induced in the two sensor coils such that the polarity of the difference changes. Combining the signals induced in the sensor coils 72 and 74 produces an output signal having an amplitude indicative of the magnitude of the applied torque and a polarity indicative of the direction of the applied torque.

In a like manner, sensor assembly 66 has a primary coil 76 and sensor coils 78 and 80. The outputs of the two sensor assemblies 64 and 66 are combined into a single output signal having a increased signal to noise ratio. This type of torque sensor eliminates the need for separate direction switches as taught by the prior art, in particular Adams U.S. Pat. No. 4,223,254 or Bayle in U.S. Pat. No. 3,983,953.

Alternatively the torque sensor may be a pair of resistance strain gauges mounted on a flexible member such as torsion bar as shown in FIG. 5. In this embodyment, torsion bar is a flat steel plate 82 interconnecting an input member 84 with an output member 86. Like input member 44, input member 84 has a splined portion 88 at one end adapted to be connected to the vehicle's steering column (not shown), a slot 90 at the internal end for receiving one end of steel plate 82, and an intermediate "poly spline" portion 92. The output member 86 has one end adapted to be connected to the vehicles steering gear box (not shown) and an internal end having a slot 94 receiving the other end of steel plate 82. The steel plate 82 is locked in slots 90 and 94 by means of pins as shown, or by any other means known in the art.

A rigid cylindrical member 96 circumscribes steel plate 82 and the internal ends of the input and output members. Cylindrical member 96 has a female "poly spline" which mates with the external poly spline portion 92 of input member 84 and slotted portion 98 which circumscribes output member 86. A pin 99 locks cylindrical member 96 to imput member 84. A pin 100 pressed in output member 86 has a diameter smaller that width of the slotted portion 98 of cylindrical member 96 permitting a rotational displacement between mewber 96 and output member 86 and limiting the rotational torque that may be applied to steel plate 82 to said predetermined value.

A pair of resistance bridge strain gauges, 102 and 104, such as bridge shear torque gauges, part number FAB-D12A-12SX, manufactured by BLH Electronics of Waltham Mass., are mounted in the central region of the steel plate 82. the bridge strain gauges 102 and 104 are bonded to the surface of steel plate 82, using any method known in the art, such as with an epoxy cement. The sensitivities of the two strain gauges are reversed, such that for a torque applied in one direction, the output signal of one of the two strain gauges increases while the output signal of the other gauge decreases. Reversing the direction of the applied torque will therefore cause the output signal of the one strain gauge to decrease and the output signal of the other strain gauge to increase. By combining the output signals of the two strain gauges 102 and 104 in a known way, the combined output signal is a torque signal having a magnitude indicative of the applied torque and a polarity indicative of the direction of the applied torque.

The electrical power to and torque signal from the two strain gauges 102 and 104 is provided by means of a flexible flat cable 106 attached at one end to the steel plate 82 through an aperture 108 in the cylindrical member 96 and connected, at the other end to an electrical terminal block 110 attached to the cover housing 112. The electrical cable 114 connecting the strain gauges to the power supply 40 is connected to the other end of terminal block 110 through an insulator grommet 116 inserted through an aperture in the cover housing 112 adjacent to terminal block 110. The flexible cable 106 is loosely spiraled about the cylindrical member 96 as shown to permit at least two complete revolutions of the input member 84 in both directions from the neutral position. Neutral position as used here and elsewhere means the position of the wheels and or the position of the steering wheel when the steered wheels are aligned along a straight path.

It is recognized that other types of torque sensors, other the magnetic or resistive bridge strain gauge sensors discussed above, may be used to detect the applied torque. For instance, a fiber optic or other type of optical gauge may be used to detect the relative displacement between the input and output members of the segmented shaft 12 to generate a signal indicative of the magnitude and direction of the applied torque. Alternatively, separate detectors may also be used to generate separate signals of the magnitude of the applied torque and the other indicative of the direction of the applied torque.

One of the key features of the invention is the combination of the low speed, high torque reversible DC electrical motor 36 in combination with the low gear ratio planetary gear drive system 18 which permits the motor 36 to be reverse driven from the output member of the segmented torque shaft 12. It has been found that with this combination, the forces generated by a moving vehicle, tending to return the wheels to their neutral position after the execution of a turn, is sufficient to drive the electric motor 36 and the vehicles steering column in the reverse direction to the neutral position. This factor eliminates the need for mechanical or electrical clutches to decouple the electric motor 36 from the output member of the segmented shaft during the return to neutral maneuver or the need for the vehicle's operator to physically return the wheels to their neutral position. In the prototype model of the electrical power assisted steering system, the electric motor 36 produced an output torque of approximately 6.1 joules (4.5 ft-lbs) at 400 RPM's with an applied electrical power of 400 watts (40 amperes at 10 volts). The input to output gear ratio of the planetary gear mechanism 18 was 4:1 resulting in a maximum torque of approximately 24 joules (18 ft-lbs) capable of being applied to the output member of the segmented shaft 12 by the electric motor assisting the driver in turning the wheels of the vehicle. With this combination, the effort required to turn the wheels of a stationary down sized front wheel drive vehicle was found to be significantly reduced from 20 joules to 2.3 joules (200 inch-lbs) which is well within the capabilities of an operator having limited physical capabilities such as a female operator. The trade offs between the output torque of the DC motor 36 and the gear ratio of the planetary gear mechanism 18 are obvious however, in order to preserve the reverse drive capabilities of the electric motor, and the operators' feel of the road at nominal and higher speeds, the gear ratio of the planetary gear mechnism 18 is preferably limited to the range between 1:1 and 14:1 with the torque output of the electric motor adjusted accordingly.

Figure 7:
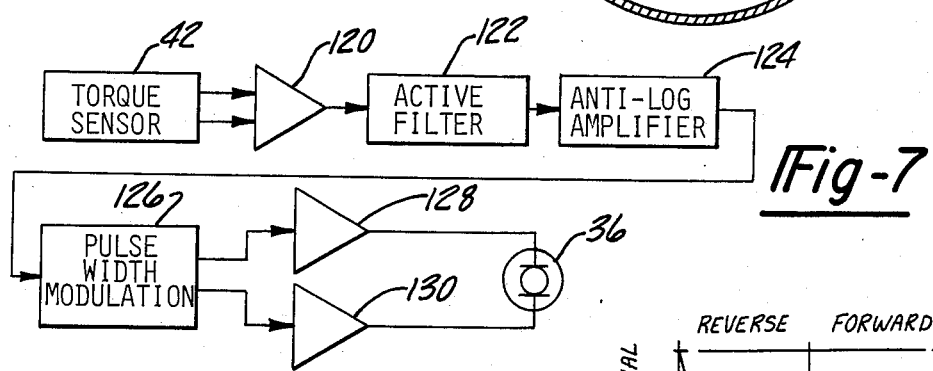
FIG. 7 is a block diagram of the antilog power amplifier.
Figure 8:
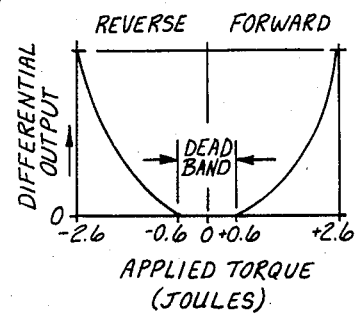
FIG. 8 is a graph showing the antilog and dead band characteristics of the power amplifier.

In order to preserve the operators feel of the road and reduce the tendency of the electrically assisted power steering system to result in oversteering at nominal and higher vehicle speeds the prior art teaches either disabling the electric motor above a predetermined vehicle speed or reducing the authority of the motor as a function of vehicle speed. The vehicle speed dependency is eliminated by the use of power amplifier 40 having an antilog power output characteristic. U.S. Pat. No. 4,471,280 "Anti-Log Power Amplifier" by Thomas E. Stack, gives the details of the antilog power amplifier 40. Briefly, referring to FIG. 7, antilog power amplifier 40, receives the torque signal output from the torque sensor 42 having a magnitude indicative of the applied torque and a polarity indicative of the direction of the applied torque. The torque signal is amplified in a preamplifier 120. The output of the preamplifier 120 has its output coupled directly to an active filter 122 which attenuates any mechanically produced resonances. The output of active filter 122 is amplified in antilog amplifier 124 which exponentially modifies the filtered signal in both negative or positive directions from a predetermined reference voltage depending upon the magnitude and the polarity of the signal received from the torque sensor 42. The antilog amplifier 124 uses the forward "turn on" characteristics of a silicon PN junctions to produce the antilog characteristics of amplifier 40. The output of the antilog amplifier 124 is received by a pulse width modulator 126 which generates a pair of pulse trains having pulse widths proportional to the input voltage. These two pulse trains are 180° out of phase and control the switching operation of the bridged power amplifiers 128 and 130. The outputs of power amplifiers 128 and 130 provide direct current inputs to the reversible DC electric motor 36. The operation of the circuit is such that the outputs of power amplifiers 128 and 130 are equal in response to a torque signal indicative of zero torque or a null. A torque signal having a first polarity will increase the integrated output current of amplifier 128 and decrease the integrated output current of amplifier 130 producing a current differential causing motor 36 to rotate in a first direction. A torque signal having the opposite polarity will decrease the integrated output current of amplifier 128 and increases the integrated output current of amplifier 130 producing a current differential causing motor 36 to rotate in the reverse direction. FIG. 8 is a graph showing the output characteristics of the antilog power amplifier 40 as a function of the magnitude and polarity of the torque applied to the vehicle's steering wheel. The antilog gain characteristics of power amplifier 40 are adjusted to produce a dead band indicative of a torque ranging from 0.4 to 0.8 joules about a torque signal indicative of zero torque. This dead band has been found to improve the road feel at nominal and above vehicle speeds while having an almost insignificant effect during low speed maneuvers. The dead band may be adjusted to accomodate different types of vehicles having steering gear trains of varying stiffness.

It is recognized that those skilled in the art may modify the disclosed electrically assisted power steering system by using different types of torsion members, torque sensors and gearing arrangements without departing from the spirit of the invention as described above and set forth in the appended claims.

What is claimed is:

1. An improved electrically assisted power steering system for an automotive vehicle having an input member adapted to be connected to the vehicle's steering wheel, an output member adapted to be connected to the vehicle's steering mechanism, a torsion member connecting the input and output members, a torque sensor generating a torque signal having a first component indicative of the magnitude of the applied torque between the input and output members and a second component indicative of the direction of the applied torque, a power amplifier for activating an electric motor in response to the torque signal, and a gear train connecting the output of the electric motor with the output member, to assist the driver in turning the wheels of the vehicle, said improvement characterized by;

power amplifier means responsive to said first and second components of said torque signal for generating an amplified signal having a magnitude component which varies as a function of the first component and having a direction component indicative of said second component;

a low speed, high torque reversible electric motor for generating a rotary output having magnitude and direction indicative of said amplified signal; and a gear train having an output to input gear ratio between 1:1 and 14:1 for transmitting the rotary output of the reversible electric motor to the output member.

2. The improved power steering system of claim 1 wherein said sensor means comprises:

a cylindrical torsion member interconnecting said input member with said output member;

first primary coil means for inducing an alternating magnetic field in said cylindrical torsion member; and first sensor coil means responsive to the perturbation of the alternating magnetic field in said cylindrical member due to an applied torque for generating a first electrical signal.

3. The improved power steering system of claim 2 further including a second primary coil means for inducing a magnetic field and a second sensor coil means for generating a second electrical signal and means for combining said first and second electrical signals generated by said first and second sensor coil means to generate a said torque signal.

4. The improved power steering system of claim 1 wherein said sensor means comprises a pair of resistance bridge strain gauges attached to said torsion member for generating said torque signal.

5. The improved power steering system of claim 1 wherein said power amplifier means generates said amplified signal having a magnitude which varies as an antilog function of said first component.

6. The improved power steering system of claim 5 wherein the first component of said torque signal has a predetermined value indicative of a zero magnitude torque applied between said input and output members, said power amplifier has a deadband of zero output for a magnitude of said first component having a value between a first value greater than said predetermined value and a second value less than said predetermiend value.

7. The improved power steering system of claim 6 wherein said first and second values of said first component are indicative of a torque between 0.4 and 0.8 joules.

8. The improved power steering system of claim 1 wherein said electric motor circumscribes at least one of said input and output members.

9. The improved power steering system of claim 8 wherein said electric motor circumscribes said input member.

10. The improved power steering system of claim 9 wherein said gear train is a planetary gear mechanism having a stationary internal gear, a sun gear concentric with said output member and driven by the rotary output of said motor, a plurality of planet gears engaging said internal and sun gears, and a planet carrier interconnecting said plurality of planet gears with said output member.

11. The improved power steering system of claim 1 further including a torque limiting member interconnecting said input and output members, said torque limiting member limiting the torque applied to said torsion member to a predetermined maximum value and providing a fail-safe interconnection between the input and output members in the event of an electrical or mechanical failure.

12. The improved power steering system of claim 11 wherein said predetermined maximum value of said limited torque is between 2.0 and 3.5 joules.

13. An electrically assisted power steering system for a vehicle having a steering wheel and a steering mechanism, said steering system comprising:
    a generally cylindrical housing;
    a shaft supported for rotation in said housing, said shaft having an input end adapted to be connected to the steering wheel and an output end adapted to be connected to the steering mechanism;
    torque sensor means responsive to a torque applied to said shaft for generating a torque signal having an amplitude component indicative of the magnitude of the torque applied between the input and output ends of said shaft and a direction component indicative of the direction of the applied torque;
    a power amplifier responsive to said torque signal for generating an amplified signal having a magnitude which varies as a function of said amplitude component of said torque signal and a rotation direction component indicative of the direction of the applied torque;
    a low speed, high torque reversible electric motor disposed in said housing and circumscribing said shaft for generating a rotary output having a torque proportional to the magnitude of said amplified signal and a direction of rotation determined by the rotation direction component of said amplified signal; and
    a gear train having a gear ratio between 1:1 and 14:1 for transmitting the rotary output of said electric motor to said shaft.

14. The steering system of claim 13 wherein said shaft includes a magnetically permeable resilient cylindrical member intermediate said input and output ends, said torque sensor means comprises:
    first primary coil means, having one end adjacent to said cylindrical member for inducing an alternating magnetic flux in said cylindrical member; and
    first sensor means responsive to the perturbation of the alternating magnetic flux in said cylindrical member due to an applied torque for generating said torque signal.

15. The steering system of claim 13 wherein said shaft includes a resilient member intermediate said input and output ends, and said torque sensor means comprises at least one resistance bridge strain gauge attached to the surface of said resilient member for generating said torque signal.

16. The steering system of claim 15 where said at least one resistance bridge strain gauge comprises two resistance bridge strain gauges attached to the surface of said resilient member.

17. The steering system of claim 13 wherein the amplitude component of said torque signal has a predetermined value corresponding to a zero torque value, said power amplifier means generates said amplified signal having a dead band of zero output for an amplitude component of said torque signal which differs from said predetermined value by less than a predetermined amount.

18. The steering system of claim 17 wherein said predetermined value of said amplitude component is zero.

19. The steering system of claim 13 wherein said gear train is a planetary gear train concentric with said shaft.

20. The steering system of claim 19 wherein said planetary gear train comprises:
    a stationary internal gear attached to said housing;
    a sun gear concentric with said shaft and rotatably driven by said reversible electric motor;
    a plurality of planet gears engaging said stationary internal gear and said sun gear; and
    a planet gear carrier interconnecting said plurality of planet gears with said shaft.

21. The steering system of claim 20 wherein said reversible electric motor comprises:
    a stationary permanent magnet stator fixedly attached to said housing; and
    a rotatable armature disposed concentric with said shaft and fixedly connected to and rotating said sun gear.

22. The steering system of claim 13 further including a torque limiting member connected to said shaft for limiting the angular displacement between the input and output ends of said shaft.

23. The steering system of claim 14 wherein said shaft includes:
    an input member having said input end;
    an output member having said output end;
    a resilient cylindrical cylinder connecting said input member with said output member; and
    means internal to said resilient cylinder for limiting the angular displacement between said input and output members.

24. The steering system of claim 19 wherein said shaft includes:
    an input member having said input end;
    an output member having said output end;
    a resilient member connecting said input and output members; and
    means circumscribing said resilient member for limiting the angular displacement between said input and output members.

25. An electrically assisted power steering system for a vehicle having a steering wheel for providing a rotary input to a steering mechanism to turn the wheels of the vehicle; said power steering system comprising:
    a housing;
    a shaft supported for rotaton in said housing, said shaft including an input end adapted to be connected to said steering wheel and an output end adapted to be connected to said steering mechanism;
    a torque sensor responsive to the torque applied between said input and output ends of said shaft for generating a torque signal indicative of the magnitude and direction of the applied torque;

a power amplifier responsive to said torque signal for generating an amplified torque signal having a first component which is an anti-log function of the magnitude of the applied torque and a second component indicative of the direction of the applied torque;

a low speed, high torque reversible electric motor disposed in said housing and concentric with said shaft for producing a rotary output having a torque corresponding to said first component of said amplified signal and a direction of rotation corresponding to said second component of said amplified signal; and a planetary gear train disposed in said housing having an input to output gear ratio between 1:1 and 14:1, said planetary gear train having an internal gear fixedly attached to said housing, a sun gear circumscribing said flexible shaft and connected to the rotary output of said electric motor, a plurality of planet gear engaging said internal gear and said sun gear, and a planet gear carrier interconnecting said plurality of planet gears with the output end of said shaft.

26. The power steering system of claim 25 wherein said shaft includes:

an input member having said input end and a first internal end;

an output member having said output end and a second internal end; and a resilient member interconnecting said first and second internal ends.

27. The power steering system of claim 26 further including a torque limiting member connecting said first and second internal ends for limiting the angular displacement between said first and second members.

28. The power steering system of claim 25 wherein said torque sensor is a magnetic torque sensor generating said torque signal in response to the perturbation of the magnetic flux in said resilient member due to an applied torque between said input and output members.

29. The power steering system of claim 25 wherein said torque sensor is at least one resistance bridge strain guage sensor for generating said torque signal in response to the strain induced in said resilient member.

30. The power steering system of claim 25 wherein said power amplifier means generates said amplified signal having a dead band of zero magnitude in response to the first component of said torque signal having a magnitude less than a predetermined value.

31. The power steering system of claim 30 wherein said predetermined value is a torque signal indicative of an applied torque of between 0.4 and 0.8 joules.

* * * * *